Oct. 26, 1948.                I. G. FOWLER ET AL                    2,452,364
                    METHOD AND APPARATUS FOR PRODUCING OPTICAL
                         ELEMENTS FROM COMMERCIAL PLATE GLASS
Filed Dec. 16, 1942                                        3 Sheets-Sheet 1
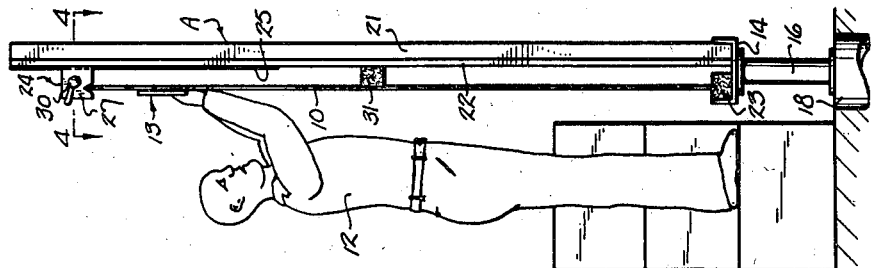
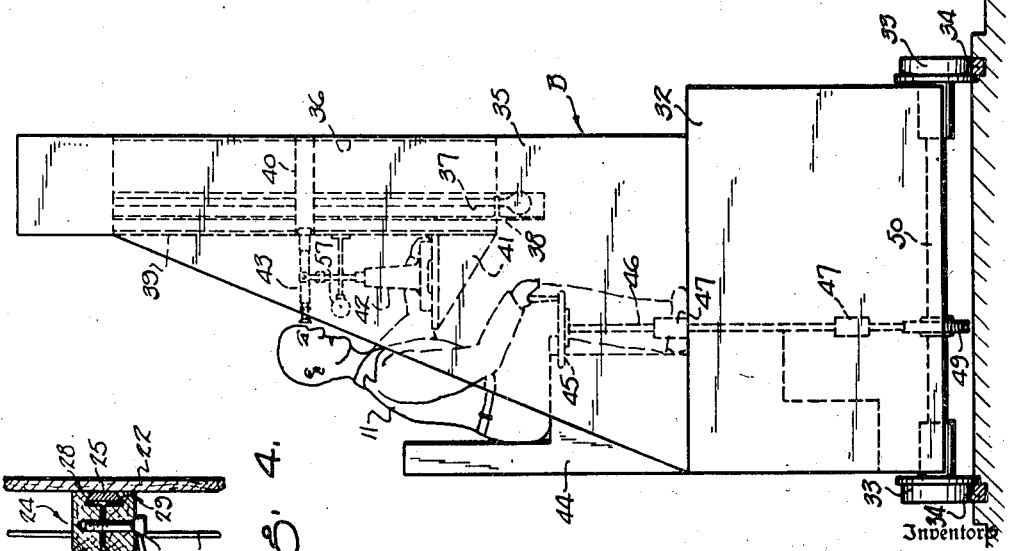
Inventors
IVAL G. FOWLER.
DONALD W. DUNIPACE.
By
Frank Fraser
        Attorney

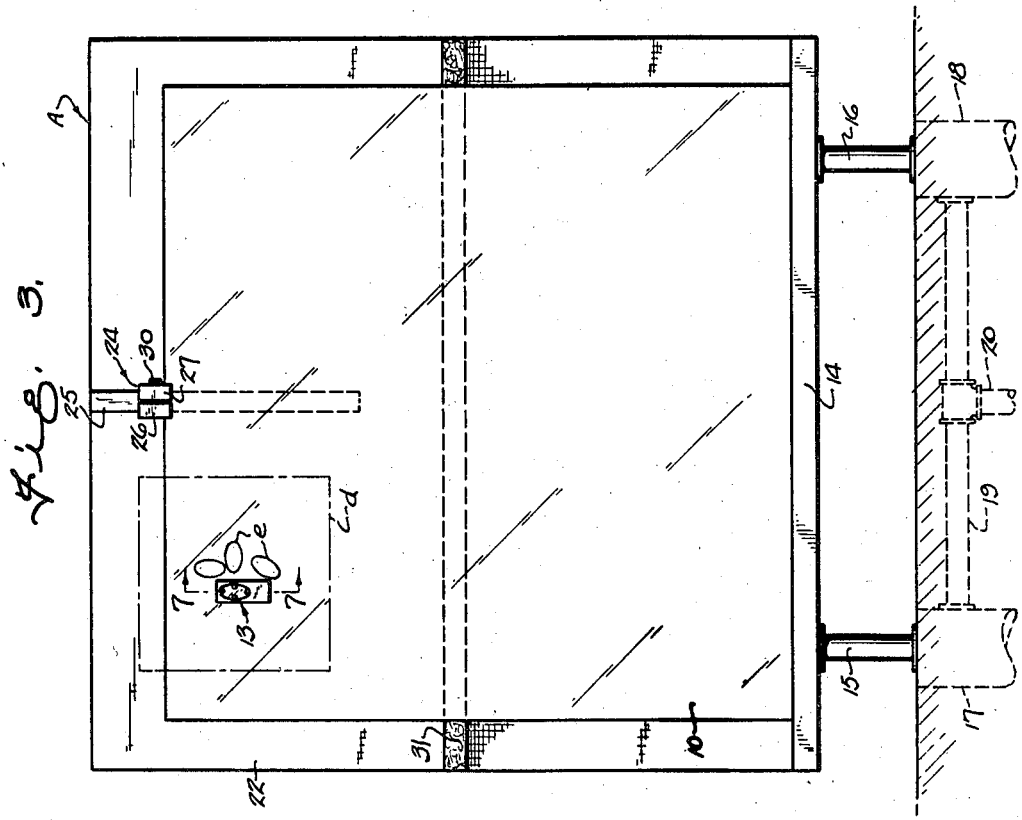
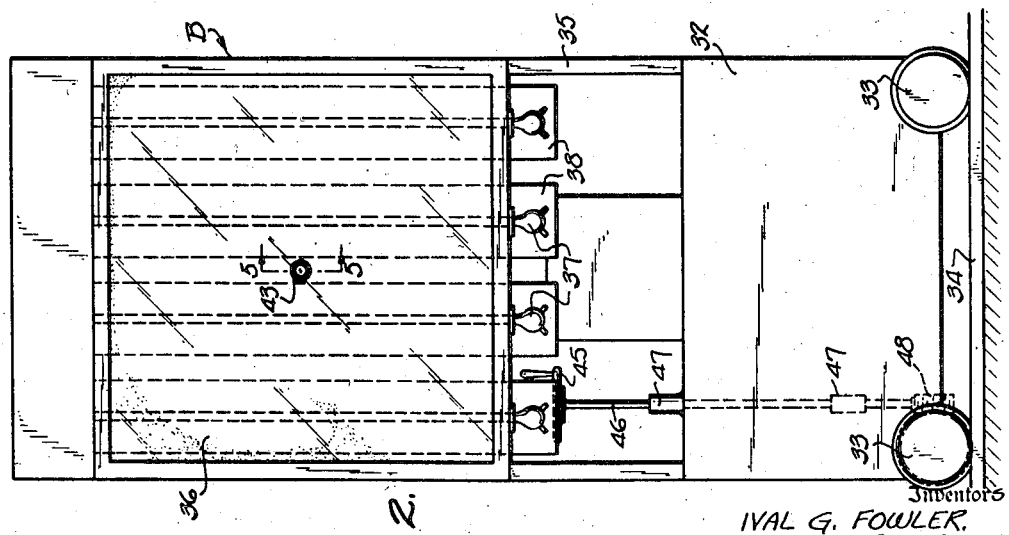

Inventors
IVAL G. FOWLER,
DONALD W. DUNIPACE.
By Frank Fraser
Attorney

Patented Oct. 26, 1948

2,452,364

UNITED STATES PATENT OFFICE 2,452,364

METHOD AND APPARATUS FOR PRODUCING OPTICAL ELEMENTS FROM COMMERCIAL PLATE GLASS

Ival G. Fowler, Toledo, and Donald W. Dunipace, Perrysburg, Ohio, assignors to Libbey-Owens-Ford Glass Company, Toledo, Ohio, a corporation of Ohio Application December 16, 1942, Serial No. 469,182

10 Claims. (Cl. 88—14)

The present invention relates broadly to the optical inspection of glass or other transparent materials and more particularly to a method and apparatus for selecting and examining areas of plate or window glass or similar transparent materials to determine their optical properties.

In various types of optical instruments, such as, for example, gun sights, range finders, sextants, etc., small glass viewing windows or reflector plates are commonly employed. In order not to adversely affect the accuracy of the instrument, the piece of glass forming the window or reflector plate must have predetermined optical properties. Thus, in order to minimize deviation in the line of sight, the two surfaces of the piece of glass should not depart from parallelism beyond a given amount, which may vary depending upon the type of instrument in which it is to be installed. A departure in the parallelism of the two surfaces of a glass sheet is commonly referred to as "wedge" in the glass.

An object of this invention is to provide a method and apparatus for locating and selecting areas in a sheet or plate of glass or similar material in which the amount of "wedge" does not exceed a predetermined value.

Another object of the invention is to provide a method and apparatus for measuring the degree of parallelism between the opposite surfaces of selected areas of a sheet or plate of glass or similar material in a rapid, efficient manner to obtain accurate and positive results.

A further object of the invention is to provide an apparatus for carrying out the invention which is so constructed and operated that relatively large sheets or plates of glass or similar material can be progressively examined to permit the selection of all areas thereof which have the required optical properties.

Other objects and advantages of the invention will become more apparent during the course of the following description, when taken in connection with the accompanying drawings.

In the drawings, wherein like numerals are employed to designate like parts throughout the same:

Fig. 1 is a side elevation of apparatus provided by the invention;

Fig. 2 is a front view of the inspection means;

Fig. 3 is a front view of the means for supporting the sheet or plate to be inspected;

Fig. 4 is a detail section taken substantially on line 4—4 of Fig. 1;

Figure 7:
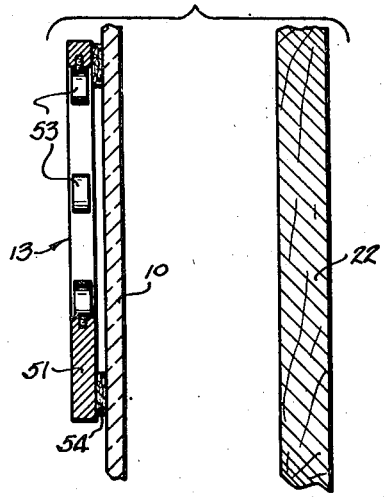
Fig. 7 is a vertical section taken substantially on line 7—7 of Fig. 3.

In carrying out the invention, the plane-parallelism of the sheet or plate of glass or other material to be inspected is determined by an optical system involving the reflection of light from the two surfaces of the sheet or plate and the examination of the pattern formed thereby. The sheet or portion thereof to be inspected is uniformly illuminated by monochromatic light and, as is well known, if sheets of glass are examined by monochromatic illumination they exhibit a series of dark and bright bands commonly referred to as interference fringes.

These color bands are due to interference between the light reflected from the front surface of the sheet and the light reflected from the back surface thereof. Perfect parallelism of the two surfaces gives a solid color whereas slight thickness variations give readily distinguishable bands or fringe. The space between the bands increases as the amount of parallelism decreases and excessive wedge gives indistinguishably fine lines. Therefore, the degree of parallelism of the sheet surfaces can be obtained by observing the arrangement and frequency of the fringes. Thus, by measuring the number of bands in a given distance, for example across a half-inch circle, the degree of "wedging" in the glass can be calculated. The interference fringes usually show up as well defined rings or bands which may approach either an elliptical, straight, parabolic, or some other pattern depending upon the nature of the departure from parallelism of the two sheet surfaces.

Referring particularly to the drawings in which is illustrated a preferred type of apparatus for carrying out the invention, the letter A designates in its entirety the means for supporting the sheet or plate to be inspected and B the means for inspecting the same; said inspection means being positioned in front of the sheet supporting means and at the desired distance therefrom. The sheet or plate 10 to be inspected is supported in a vertical position and is adapted to be examined by an operator 11 located upon the inspection means B. A second operator 12 working in cooperation with operator 11 and using a measuring device 13 marks the areas selected by the first operator which have the required degree of parallelism, as will be more fully hereinafter described.

The means A for supporting the sheet 10 to be inspected comprises a horizontal channel member 14 supported adjacent its opposite ends by vertical plungers 15 and 16 operating in cylinders 17 and 18 respectively. The cylinders 17 and 18 are connected together by a pipe 19 with which communicates a conduit 20 leading to a suitable type apparatus for actuating the plungers 15 and 16 in cylinders 17 and 18 to move the channel member 14 upwardly and downwardly and thereby vary the position of the sheet 10 to be inspected vertically relative to the inspection means B. Of course, any other suitable type means may be provided for raising and lowering the sheet 10.

Carried by the channel member 14 is a vertically disposed rectangular frame 21 and secured thereto is a panel 22 constituting a back-board and having its front surface painted black or provided with a suitable covering to give a black background in front of which the sheet 10 of glass or other material to be inspected is supported. Arranged within the channel member 14 forwardly of backboard 22 is a pad 23 of felt or other suitable cushioning material for supporting the glass sheet at its lower edge. The glass sheet is held in place by a clamping block 24 engaging the upper edge thereof and being slidably carried by a vertical guide bar 25 secured to the back-board 22 intermediate the opposite ends thereof.

The clamping block 24 is formed of two parts 26 and 27 provided with undercut mating grooves 28 and 29 respectively which receive the guide bar 25 therein as shown in Fig. 4; the two parts 26 and 27 being secured together by a screw 30. Upon loosening the screw 30, the clamping block can be moved upon or down along the guide bar and secured in the desired position upon tightening of said screw. In this way, glass sheets of different height can be readily secured in place. The back-board 22 may also be provided intermediate the top and bottom thereof with one or more horizontal cushioning pads 31 which assist in maintaining the glass sheet in a vertical position and avoid vibration thereof.

The inspection means B comprises a truck 32 mounted upon wheels 33 which run along rails 34 extending parallel to the plane of the glass sheet 10. Carried upon the truck 32 is a housing 35 provided in the front thereof with an opening in which is mounted a light diffusing screen 36, preferably consisting of a glass plate having a suitable type light diffusing surface which may be formed by frosting, etching or grinding; by providing the glass plate with a coating of white enamel, or in any other desired manner. Arranged in back of the light diffusing screen 36 is a suitable source of substantially monochromatic illumination preferably consisting of a plurality of Cooper-Hewitt mercury lamps 37 mounted in front of the reflector plates 38. The lamps 37 are disposed in a vertical position and are spaced from one another so that they effect a uniform illumination of the diffusing screen which in turn effects the uniform illumination of the field of view or, in other words, the portion of the glass sheet 10 to be inspected.

Figure 5:
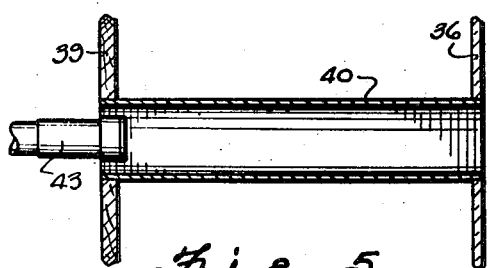
Fig. 5 is a detail section taken substantially on line 5—5 of Fig. 2.

Mounted in back of the mercury lamps 37 is a plate 39 and extending between the said plate and diffusing screen 36 centrally thereof is a horizontal tube 40 having its opposite ends fitting within aligned openings in said plate and diffusing screen as shown in Fig. 5.

Secured to the plate 39 is a bracket 41 and mounted thereupon is a standard 42 carrying a telescope 43 through which the operator 11 examines the illuminated portion of the glass sheet 10. The forward end of the telescope is directed through the tube 40 which serves to shield the telescope from the light source. To facilitate the inspection of the glass sheet, the truck 32 may be provided with a seat 44 for the operator 11.

As pointed out above, the sheet 10 to be inspected is supported in such a way that it can be raised and lowered, while the inspection means B is mounted upon rails 34 for movement horizontally in a plane parallel to the plane of the sheet. The desired movement of the inspection means can be effected by the operator 11 by turning the hand-wheel 45 fixed to the upper end of a vertical shaft 46 journaled in spaced bearings 47 and having keyed to its lower end a worm 48 meshing with a worm gear 49 on the axle 50 of wheels 33. The combined movements of the sheet 10 and inspection means B permit successive portions of a relatively large sheet of glass or other material to be progressively examined.

Figure 6:
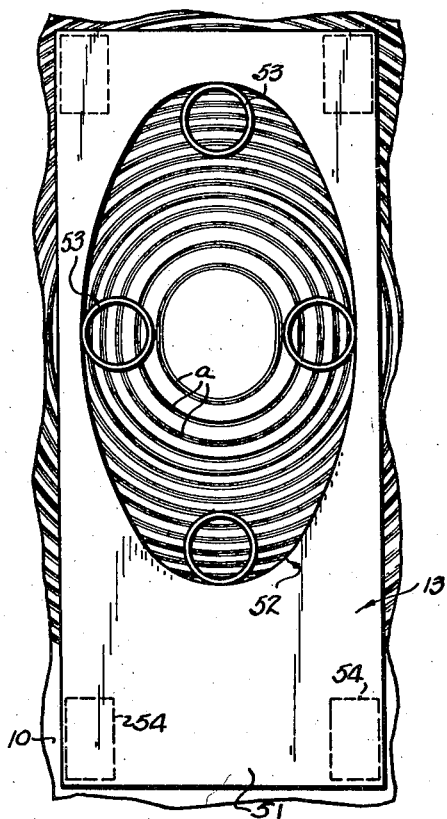
Fig. 6 is a front view of the measuring device.
Figure 9:
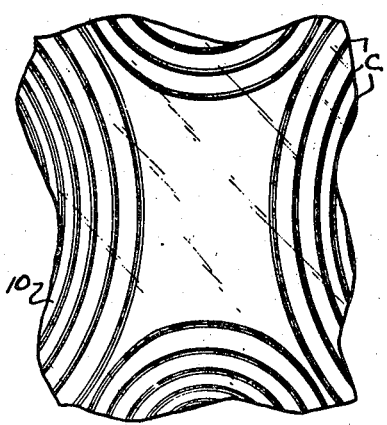
Fig. 9 shows another type of interference pattern on the sheet to be inspected.

In the operation of the apparatus, the mercury lamps 37 uniformly illuminate the diffusing screen 36 which in turn uniformly illuminates the field of view or, in other words, the portion of the glass sheet 10 to be inspected as indicated by the broken lines $d$ in Fig. 3. The light from the lamps 37 may be rendered more nearly monochromatic by the use of filters located at any desired point in the path of the light. The field of view is approximately one-quarter the area of the diffusing screen 36. As explained above, when sheets of glass are illuminated by monochromatic light or substantially monochromatic light, they exhibit a series of dark and bright bands which are known as interference fringes created by the reflections from the two surfaces of the sheet. The operator 11 examining the illuminated portion $d$ of the sheet 10 through the telescope 43 can readily see these interference bands and can determine according to the arrangement and number of bands in a given distance the "wedging" or departure from parallelism of the two surfaces of the sheet. Various types of interference patterns are formed in the glass depending upon the relation of the sheet surfaces to one another and three different types of interference patterns $a$, $b$, and $c$ have been illustrated respectively in Figs. 6, 8 and 9. In Fig. 6, the interference bands $a$, approach the form of concentric ellipses; in Fig. 8, the bands $b$ are straight; while, in Fig. 9, the bands $c$ are hyperbolic in character.

The operator 12 working in cooperation with operator 11 marks the areas of glass selected by operator 11 as having the required optical properties. To assist in the selection and marking of the glass, the operator 12 is provided with the measuring device 13, which may be of the type illustrated in Figs. 6 and 7. The measuring device is in the form of a mask comprising a rectangular plate 51 provided with an opening 52 which may be circular, oval or of any other desired shape depending upon the shape of the area of glass to be examined. Secured to the wall of the opening 52 are one or a plurality of gauge rings 53 of predetermined diameter. The plate 51 may also be provided with pads 54 of cushioning material which engage the glass sheet without scratching.

In practice, while the operator 11 examines the illuminated portion $d$ of the glass sheet 10 through the telescope 43, operator 12 moves the mask 13 as directed by operator 11 over said sheet until an area having a predetermined number of interference fringes within the gauge rings 53 is located. In other words, assuming that the specifications call for a reflector plate or a viewing window in which the wedge does not exceed a predetermined amount which can be expressed as a specified frequency of interference fringes, the mask is moved over the sheet until the permissible number of fringes can be counted within the gauge rings. This indicates that this particular area of the glass has the required parallelism and is marked by the operator 12. Whenever the operator 11 may be in doubt as to the frequency of interference fringes over areas not covered by gauge rings 53, then operator 12 can explore any such area by means of a ring 55 carried by a handle 56 (Fig. 8) and serving as an auxiliary gauge while maintaining the mask 13 over the area being considered. The operator 11 may instruct operator 12 as to the positioning of the mask 13 and marking of any selected area of the sheet by the use of a suitable communication system including a microphone 57 on inspection means B and a loud speaker (not shown) located in proximity to the sheet supporting means A.

After one area of the sheet has been selected and marked, the mask is again moved over the illuminated portion d so that another area also having the specified requirements is selected and marked. Thus, as shown in Fig. 3, three areas e have been selected and marked and the mask 13 is shown as positioned over still another area. In this way, the entire field of view is covered and by raising the glass sheet and moving the inspection means horizontally successive portions of the entire sheet can be progressively examined, after which it can be removed from the supporting means and the selected areas cut therefrom.

The telescope 43 should be so selected that it has sufficient power to show the interference fringes, while the aperture therein should be small enough to prevent blurring of the fringes due to too great a range of angle of incidence. The distance the inspection means is positioned from the sheet to be examined is dependent upon the relation of the portion to be inspected to the field of view of the telescope and, in addition, the distance should be such that the rays of light striking the sheet are substantially parallel with one another and pass through the sheet with as small an angle of incidence as possible.

Figure 8:
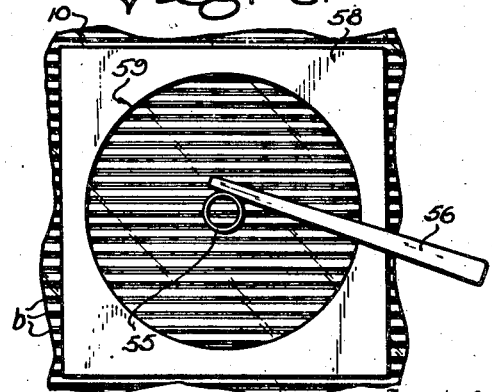
Fig. 8 is a front view of a different type of measuring device.

If desired, a measuring device consisting of a plate 58 having a suitably shaped opening 59 therein as shown in Fig. 8 may be used and the frequency of fringes measured by moving the gauge ring 55 to any position within the opening 59 to determine the parallelism of any portion of the area within said opening.

By the methods herein provided, it is possible to locate and select areas in the glass sheet which have predetermined amounts of wedge so that the rate of thickness variation in the glass can be readily determined. By so inspecting the glass, deviation of transmitted light rays through the selected pieces of glass when used in optical instruments can be controlled.

We claim:

1. An apparatus for the optical inspection of sheets or plates of glass or similar material to determine the amount of wedge therein, comprising elevator means for supporting the sheet to be inspected, inspection means remote from said sheet as measured along the line of sight thereto, said inspection means including a light diffusing screen having an opening therein, a source of substantially monochromatic light in back of said diffusing screen for illuminating the same and which in turn illuminates a portion of the sheet and a telescope directed through the opening in the diffusing screen and through which the illuminated portion of the sheet can be examined for interference fringes, and means for moving the sheet and the inspection means relative to one another to effect the progressive illumination and examination of other portions of the sheet.

2. The method of producing precision elements from sheets of plate glass comprising, supporting the sheet for inspection, illuminating an expanse of the sheet by substantially monochromatic light, examining the illuminated expanse for interference fringes, and marking areas of predetermined size and shape in which the amount of wedge does not exceed a specified value found within said expanse, and then cutting the marked areas from the sheet.

3. The method of producing precision elements from sheets of plate glass comprising, supporting the sheet for inspection, uniformly illuminating a substantial portion of the sheet by substantially monochromatic light, examining the illuminated portion of the sheet through an optical inspection apparatus and marking the maximum number of areas, of predetermined size and shape and in which the amount of wedge does not exceed a specified value, to be found within said portion, effecting relative movement between the sheet and inspection apparatus to progressively illuminate other portions of the sheet and successively examining and marking the same, and finally cutting the marked areas from the sheet.

4. The method of producing precision elements from sheets of plate glass comprising, supporting the sheet for inspection, uniformly illuminating a substantial portion of the sheet by diffused substantially monochromatic light, examining the illuminated portion of the sheet from a distance through a telescope and marking in outline the maximum number of areas, of predetermined size and shape and in which the amount of wedge does not exceed a specified value, to be found within said portion, progressively illuminating other portions of the sheet and examining and marking the same, and finally cutting the marked portions from the sheet.

5. In a method of producing precision elements from sheets of plate glass the steps of, uniformly illuminating the sheet by rays of substantially monochromatic light substantially normal to the plane of the sheet and substantially parallel with each other, examining the illuminated sheet and marking areas of predetermined size and shape in which the amount of wedge does not exceed a specified value within said sheet, to determine the lines along which precision glass elements can be cut from said sheet.

6. Optical inspection apparatus for determining the amount of wedge within selected expanses or areas in sheets of transparent materials such as plate glass, comprising means for supporting the sheet to be inspected; inspection means remote from said sheet as measured along the line of sight thereto, including an extended source of substantially monochromatic light positioned to uniformly illuminate an expanse of the sheet, and a telescope associated with said light source and adjusted to examine said illuminated expanse for interference fringes; and means for causing relative movement between the sheet and inspection means to effect the progressive illumination and examination of other expanses of the sheet.

7. Optical inspection apparatus for determining the amount of wedge in sheets of transparent materials such as plate glass, comprising means for supporting the sheet to be inspected; inspection means remote from said sheet as measured along the line of sight thereto, including an extended source of substantially monochromatic light positioned to uniformly illuminate an expanse of the sheet, and a telescope positioned within the area of said light source and adjusted to examine said illuminated expanse for interference fringes; means for moving the sheet vertically; and means for moving the inspection means horizontally in the plane of the sheet to effect the progressive illumination and examination of other expanses of the sheet.

8. Inspection apparatus for determining the amount of wedge in sheets of plate glass, comprising means for supporting the sheet to be inspected; and inspection means remote from said sheet as measured along the line of sight thereto, including as an extended source of monochromatic light positioned to uniformly illuminate an expanse of the sheet, a light diffusing screen having an opening therein and a source of substantially monochromatic light in back of said screen, and a telescope directed through the opening in the diffusing screen and adjusted to examine said illuminated expanse for interference fringes.

9. Apparatus for locating precision areas of predetermined size and shape in sheets of transparent materials such as plate glass, comprising means for supporting the sheet to be inspected; inspection means remote from said sheet as measured along the line of sight thereto, including as an extended source of monochromatic light positioned to uniformly illuminate an expanse of the sheet a light diffusing screen having an opening therein and a source of substantially monochromatic light in back of said screen, and a telescope directed through the opening in the diffusing screen and adjusted to examine said illuminated expanse for interference fringes, the distance between said inspection means and said sheet as measured along the line of sight from the former to the latter being sufficient to reduce the angle of incidence of the rays of monochromatic light passing through the sheet and forming the pattern of interference fringes being examined to a point where they are substantially normal to the plane of said sheet and substantially parallel with one another.

10. Inspection apparatus for determining the amount of wedge in sheets of plate glass, comprising means for supporting the sheet to be inspected; and inspection means remote from said sheet as measured along the line of sight thereto, including as an extended source of monochromatic light positioned to uniformly illuminate an expanse of the sheet, a light diffusing screen having an opening therein and a source of substantially monochromatic light in back of said screen, and a telescope directed through the opening in the diffusing screen and adjusted to examine said illuminated expanse for interference fringes, the distance between said inspection means and said sheet as measured along the line of sight from the former to the latter being sufficient to reduce the angle of incidence of the rays of monochromatic light passing through the sheet and forming the pattern of interference fringes being examined to a point where they are substantially normal to the plane of said sheet and substantially parallel with one another; and means for causing relative movement between the sheet and inspection means to effect the progressive illumination and examination of other expanses of the sheet.

IVAL G. FOWLER.
DONALD W. DUNIPACE.

REFERENCES CITED

The following references are of record in the file of this patent:

UNITED STATES PATENTS

| Number | Name | Date |
| --- | --- | --- |
| 536,759 | Potter | Apr. 2, 1895 |
| 674,951 | Abbe | May 28, 1901 |
| 815,859 | Palis | Mar. 20, 1906 |
| 1,332,124 | Harney | Feb. 24, 1920 |
| 1,875,665 | Schwiezer | Sept. 6, 1932 |
| 2,042,526 | Hohmann | June 2, 1936 |
| 2,047,221 | Pechy | July 14, 1936 |
| 2,239,263 | Waine et al. | Apr. 22, 1941 |
| 2,253,054 | Tuttle et al. | Aug. 19, 1941 |
| 2,312,888 | Everest | Mar. 2, 1943 |
| 2,337,877 | Drescher | Dec. 28, 1943 |
| 2,338,981 | Straub | Jan. 11, 1944 |

Certificate of Correction

Patent No. 2,452,364. October 26, 1948.

IVAL G. FOWLER ET AL.

It is hereby certified that error appears in the printed specification of the above numbered patent requiring correction as follows:

Column 5, line 72, claim 1, strike out the word "elevator";

and that the said Letters Patent should be read with this correction therein that the same may conform to the record of the case in the Patent Office.

Signed and sealed this 1st day of March, A. D. 1949.

[SEAL]

THOMAS F. MURPHY,
*Assistant Commissioner of Patents.*